(12) United States Patent
Gudihal et al.

(10) Patent No.: US 12,412,158 B2
(45) Date of Patent: Sep. 9, 2025

(54) DATA-DRIVEN DECISION ENHANCEMENT

(71) Applicant: INTERNATIONAL BUSINESS MACHINES CORPORATION, Armonk, NY (US)

(72) Inventors: Arpita Girish Gudihal, Pune (IN); Venkata Vara Prasad Karri, Visakhapatnam (IN); Akash U. Dhoot, Pune (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 17/484,243

(22) Filed: Sep. 24, 2021

(65) Prior Publication Data
US 2023/0093988 A1   Mar. 30, 2023

(51) Int. Cl.
*G06Q 10/1053* (2023.01)
*G06F 16/21* (2019.01)
(Continued)

(52) U.S. Cl.
CPC ....... *G06Q 10/1053* (2013.01); *G06F 16/211* (2019.01); *G06F 16/2458* (2019.01); *G06N 20/20* (2019.01)

(58) Field of Classification Search
CPC .. G06F 16/2458; G06F 16/211; G06F 16/245; G06F 16/24575; G06F 16/3329;
(Continued)

(56) References Cited

U.S. PATENT DOCUMENTS

| 10,685,329 | B2 | 6/2020 | Taylor et al. |
| 2009/0119348 | A1* | 5/2009 | Liu ........................ G06F 16/25 707/999.203 |

(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
(Continued)

*Primary Examiner* — Ajay M Bhatia
*Assistant Examiner* — Berhanu Mitiku
(74) *Attorney, Agent, or Firm* — Harrity & Harrity, LLP (57) ABSTRACT

Enhancing data-driven decision making can include generating a contextual insight data structure using a first artificial intelligence system operating on information data structures selected based on a context of a programmatically defined action. A perception data structure can be generated using a second artificial intelligence system that performs natural language processing of programmatically defined action communications. The perception data structure and the contextual insight data structure can be compared, and in response to detecting a structural variance, the perception data structure can be populated with one or more data items selected from the information data structures. A delta can be determined between the contextual insight data structure and the perception data structure based on a predetermined metric that measures a quantitative difference between the contextual insight object and the perception object. An electronic recommendation based on the delta can be generated and delivered to a user via a user device.

20 Claims, 6 Drawing Sheets

(51) Int. Cl.
*G06F 16/2458* (2019.01)
*G06N 20/20* (2019.01)

(58) Field of Classification Search
CPC ...... G06F 16/951; G06F 9/5072; G06F 40/30; G06F 16/2365; G06F 17/30; G06Q 10/1053; G06Q 50/00; G06N 20/20; G06N 20/00; G06N 3/08; G06N 5/02
See application file for complete search history.

(56) References Cited

U.S. PATENT DOCUMENTS

| | | | | |
|---|---|---|---|---|
| 2015/0100575 | A1* | 4/2015 | Shae | G06Q 30/0282 |
| | | | | 707/737 |
| 2018/0189781 | A1* | 7/2018 | McCann | G06Q 20/202 |
| 2019/0005195 | A1* | 1/2019 | Peterson | G16H 10/60 |
| 2019/0236173 | A1* | 8/2019 | Ghatage | G06F 16/22 |
| 2019/0388787 | A1 | 12/2019 | Padmanabhan et al. | |
| 2020/0051293 | A1* | 2/2020 | Hou | G06F 16/904 |
| 2020/0051923 | A1* | 2/2020 | Hou | G06F 16/904 |
| 2020/0143329 | A1 | 5/2020 | Gamaliel | |
| 2020/0265329 | A1 | 8/2020 | Thomsen et al. | |
| 2020/0295919 | A1 | 9/2020 | Covaci et al. | |
| 2020/0380405 | A1 | 12/2020 | Trim et al. | |

OTHER PUBLICATIONS

"Digital twin," [online] From Wikipedia, the free encyclopedia [retrieved Sep. 24, 2021], retrieved from the Internet: <https://en.wikipedia.org/wiki/Digital_twin>, 10 pg.

Disclosed Anonymously, IP.com, IPCOM000234751D, "Method and System for Detecting a Bias in a Hiring Process", Jan. 31, 2014, 3 pages.

Disclosed Anonymously, IP.com, IPCOM000259904D, An Automated System and Method to Prevent, Detect and Mitigate Bias during Employee Recruitment, Sep. 29, 2019, 5 pages.

* cited by examiner

┌──────────────────────────────────────────────────────────────────────────┐
│ Generate a contextual insight data structure using a first artificial intelligence system that operates │
│ on one or more information data structures selected based on a system-determined context of a │
│ programmatically defined action │
│ 202 │
└──────────────────────────────────────────────────────────────────────────┘
                                         ↓
┌──────────────────────────────────────────────────────────────────────────┐
│ Generate a perception data structure using a second artificial intelligence system that performs │
│ natural language processing of one or more electronic communications exchanged among a │
│ plurality of users relating to the programmatically defined action │
│ 204 │
└──────────────────────────────────────────────────────────────────────────┘
                                         ↓
┌──────────────────────────────────────────────────────────────────────────┐
│ Compare the perception data structure and the contextual insight data structure │
│ 206 │
└──────────────────────────────────────────────────────────────────────────┘
                                         ↓
┌──────────────────────────────────────────────────────────────────────────┐
│ In response to detecting a structural variance between the perception data structure and the │
│ contextual insight data structure from the comparing, populate the perception data structure with │
│ one or more data items selected from the information data structures │
│ 208 │
└──────────────────────────────────────────────────────────────────────────┘
                                         ↓
┌──────────────────────────────────────────────────────────────────────────┐
│ Determine a delta between the contextual insight data structure and the perception data structure, │
│ wherein the delta is based on a predetermined metric that measures a quantitative difference │
│ between the contextual insight object and the perception object │
│ 210 │
└──────────────────────────────────────────────────────────────────────────┘
                                         ↓
┌──────────────────────────────────────────────────────────────────────────┐
│ Generate an electronic recommendation based on the delta and delivering the electronic │
│ recommendation to at least one of the plurality of users via a user device │
│ 212 │
└──────────────────────────────────────────────────────────────────────────┘

DATA-DRIVEN DECISION ENHANCEMENT

TECHNICAL FIELD

This disclosure relates to generating recommendations for programmatically defined actions representing decisions using computer-based machine learning and/or artificial intelligence.

BACKGROUND

Organizations of all types, including businesses, governmental entities, and non-profit organizations, rely on individuals to make critical decisions. Regardless of an organization's structure—whether a highly structured hierarchy, an informal coalition, or some variant thereof—successful attainment of the organization's objectives typically depends on key decisions made by members of the organization. Often decisions are based on the decision maker's intuition, especially if the information available to the decision maker is limited. With advances in hardware and software coupled with ever greater amounts of electronic data, however, decisions once based exclusively on observation and intuition are increasingly data driven.

SUMMARY

In one or more embodiments, a computer-implemented method can include generating a contextual insight data structure using a first artificial intelligence system that operates on one or more information data structures selected based on a system-determined context of a programmatically defined action. The method can include generating a perception data structure using a second artificial intelligence system that performs natural language processing of one or more electronic communications exchanged among multiple users relating to the programmatically defined action. The method can include comparing the perception data structure and the contextual insight data structure, and in response to detecting a structural variance between the perception data structure and the contextual insight data structure, populating the perception data structure with one or more data items selected from the information data structures. The method can include determining a delta between the contextual insight data structure and the perception data structure, wherein the delta is based on a predetermined metric that measures a quantitative difference between the contextual insight object and the perception object. The method can include generating an electronic recommendation based on the delta and delivering the electronic recommendation to at least one of the users via a user device.

In one or more embodiments, a system includes a processor configured to initiate operations. The operations can include generating a contextual insight data structure using a first artificial intelligence system that operates on one or more information data structures selected based on a system-determined context of a programmatically defined action. The operations can include generating a perception data structure using a second artificial intelligence system that performs natural language processing of one or more electronic communications exchanged among multiple users relating to the programmatically defined action. The operations can include comparing the perception data structure and the contextual insight data structure, and in response to detecting a structural variance between the perception data structure and the contextual insight data structure, populating the perception data structure with one or more data items selected from the information data structures. The operations can include determining a delta between the contextual insight data structure and the perception data structure, wherein the delta is based on a predetermined metric that measures a quantitative difference between the contextual insight object and the perception object. The operations can include generating an electronic recommendation based on the delta and delivering the electronic recommendation to at least one of the users via a user device.

In one or more embodiments, a computer program product includes one or more computer readable storage media having instructions stored thereon. The instructions are executable by a processor to initiate operations. The operations can include generating a perception data structure using a second artificial intelligence system that performs natural language processing of one or more electronic communications exchanged among multiple users relating to the programmatically defined action. The operations can include comparing the perception data structure and the contextual insight data structure, and in response to detecting a structural variance between the perception data structure and the contextual insight data structure, populating the perception data structure with one or more data items selected from the information data structures. The operations can include determining a delta between the contextual insight data structure and the perception data structure, wherein the delta is based on a predetermined metric that measures a quantitative difference between the contextual insight object and the perception object. The operations can include generating an electronic recommendation based on the delta and delivering the electronic recommendation to at least one of the users via a user device.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to generating recommendations for programmatically defined actions representing decisions using computer-based machine learning and/or artificial intelligence. Many businesses, governmental entities, and other organizations operate in increasingly complex environments and thus place ever-greater emphasis on data to augment their decision making. Even those organizations that confront little or no complexity nonetheless benefit greatly from decision making that relies on data rather than intuition or observation alone. Notwithstanding the benefit of data-driven decision making, however, there is no assurance that decision makers appropriately leverage the insights afforded by the data in taking certain actions decisions. Their decisions may yet be affected by internal biases, personal or organizational. Misperceptions, persistent or intermittent, also can affect their decisions despite the insights afforded by the availability of useful data. Thus, even if the reliability of the data can be enhanced by discovering and discarding data corrupted by bias, there remains a need to discern and mitigate bias in the decision making itself.

In accordance with the inventive arrangements described within this disclosure, example methods, systems, and computer program products are provided that are capable of enhancing data-driven decision making. An aspect of the inventive arrangements disclosed herein is quantifying a decision maker's perception using artificial intelligence (AI) and generating data structures based on objective data pertaining to programmatically defined actions. Another aspect is using AI to quantify a divergence between the decision maker's perception and objective data. Quantifying the magnitude and direction of the divergence can guide decision making to increase the likelihood that a programmatically defined action taken is consistent with objective data, that is, to enhance the data-driven decision making that pertains to the programmatically defined action.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
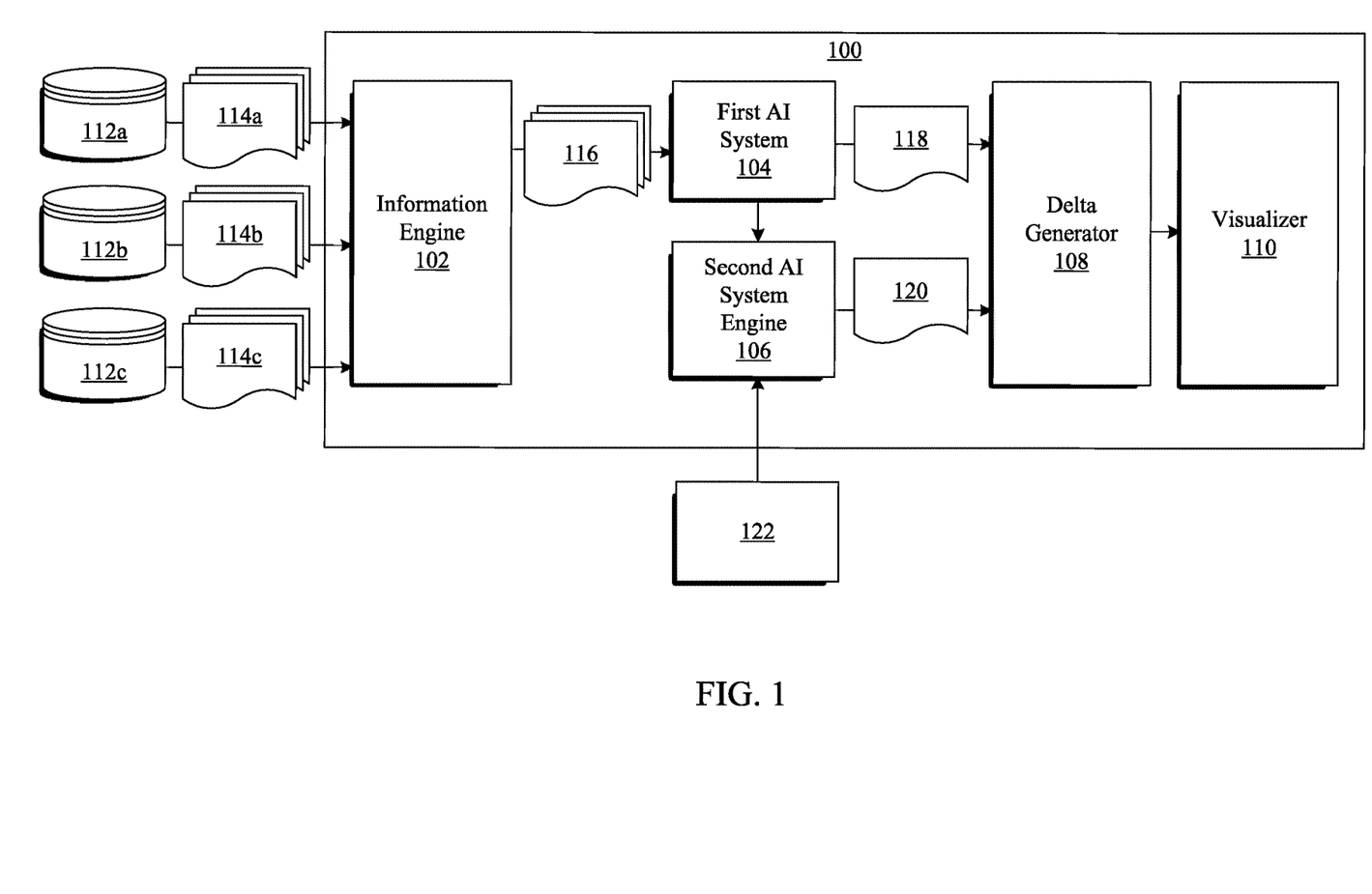
FIG. 1 illustrates an example data-driven decision enhancement system.
Figure 2:
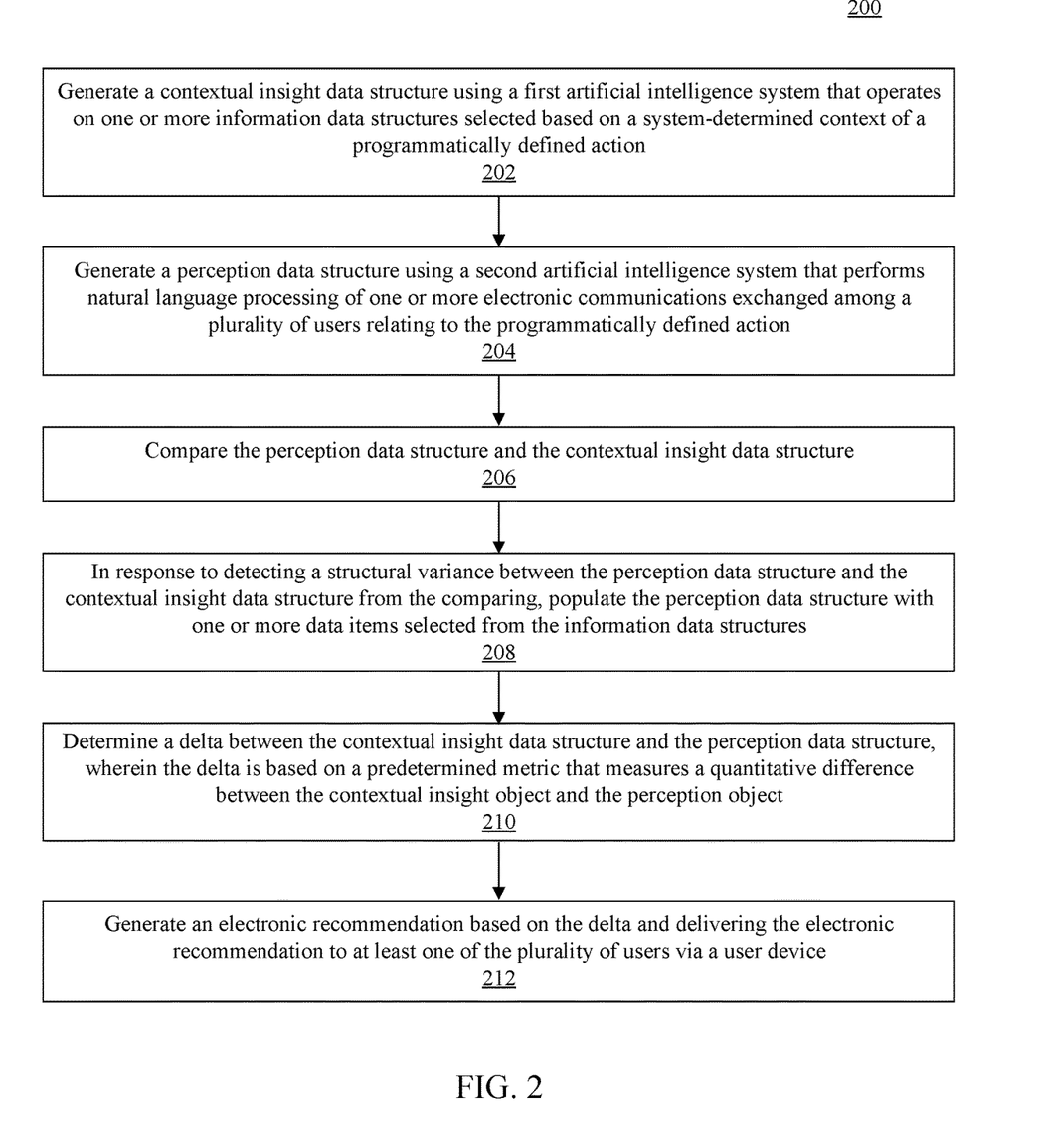
FIG. 2 illustrates an example method of enhancing data-driven decisions using the system of FIG. 1
Figure 4:
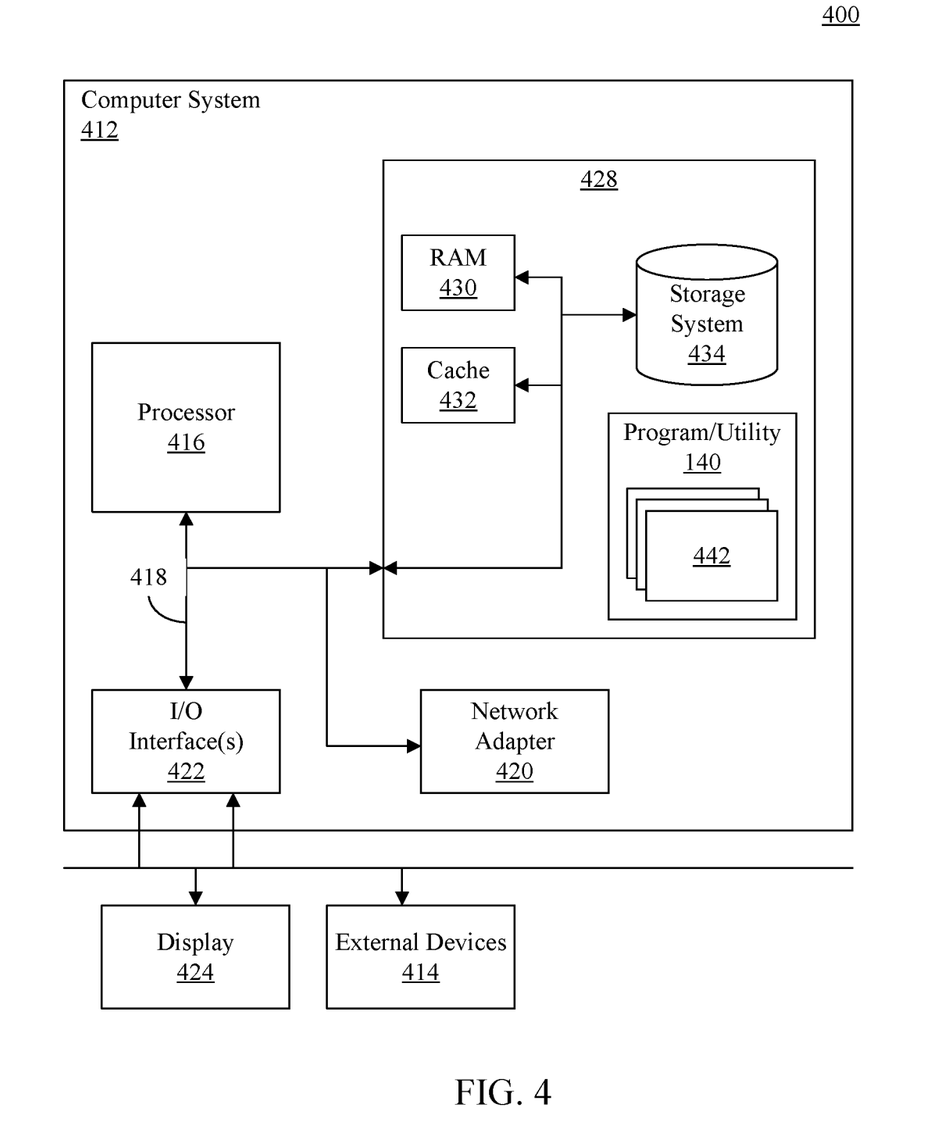
FIG. 4 illustrates an example computing node capable of implementing the system of FIG. 1.

FIGS. 1 and 2, respectively, illustrate example data-driven decision enhancement system (system) 100 and example methodology 200, which can be performed by system 100. Illustratively, system 100 includes information engine 102, first AI system 104, second AI system 106, delta generator 108, and visualizer 110. Each of information engine 102, first AI system 104, second AI system 106, delta generator 108, and visualizer 110 of system 100 can be implemented in hardware (e.g., dedicated hardwired circuitry), software (e.g., program code executed by one or more processors), or a combination thereof. For example, system 100 in certain embodiments is implemented in a computing node such as computing node 400 (e.g., enterprise server or cloud-based server), in which system 100 comprises program code that is electronically stored in a memory such as memory 428 and executes on one or more processors such as processor 416 of computer system 412 (FIG. 4).

Information engine 102 is capable of searching data sources 112a, 112b, and 112n, selecting decision-relevant data 114a, 114b, and 114n (selected as described below) from one or more of data sources 112a-112n, retrieving the selected data, and converting the selected data into a machine-readable format for use by other components of system 100. For purposes of illustration, only data sources 112a-112n are explicitly shown. It is to be understood, however, that the number of data sources queried by information engine 120 for data retrieval and data manipulation can vary. Decision-relevant data 114a-114n can include text, audio, video, and smart device feeds, for example. Data sources 112a-112n can include, for example, an enterprise data lake, one or more enterprise data warehouses, one or more enterprise data marts, and/or other repositories of data specifically related to an enterprise. Additionally, or alternatively, data sources 112a-112n also can include data sources external to an enterprise, including without limitation data sources such as web sites, social networking sites, and blogs. Information engine 102 can communicatively couple with data sources 112a-112n via wired or wireless connections over one or more data communication networks, including without limitation local area networks (LANs), wide area networks (WANs), the Internet, and various IoT device feeds.

Operatively, information engine 102 collects, organizes, and formats data originating in diverse forms into machine-readable data usable by the other components of system 100. For example, information engine 102 is capable of converting unstructured data to structured data stored as one or more data structures. The data structures comprise information data structures.

At block 200, first AI system 104 is capable of generating contextual insight data structure 118 by operating on one or more information data structures 116 that are selected based on a system-determined context of programmatically defined action related to a pending decision by a user who is the designated decision maker. In some embodiments, the user indicates the programmatically defined action by supplying input to first AI system 104. For example, in the context of an enterprise user, the user can enter data that first AI system 104 recognizes as indicating an action such as a decision regarding hiring—for example, whether to hire a candidate, select a vendor, or choose a consulting firm. The programmatic action may be one of a predetermined number of different types corresponding to recurring decisions for the enterprise, and the user may need only select one from a system-generated menu to indicate to first AI system 104 the programmatically defined action.

Given the programmatically defined action, first AI system 104 is capable of determining the context of the programmatically defined action. In certain arrangements, AI system 104 uses a natural language classifier (e.g., IBM's Watson® Natural Language Classifier) to classify text and/or speech into n predetermined categories that each correspond to a specific context corresponding to a specific decision. More generally, first AI system 104 can determine a context using a deep learning neural network that learns from a set of training data to discern the context of a pending decision based on one or more communications. The communications can be in the form of a written communication (e.g., decision memoranda, emails, text messages, voice conversations). To train the deep learning neural network, example text or speech is broken down into tokens (e.g., words, characters, or n-grams) and converted to tensors (e.g., vectors). Once trained, the deep learning neural network implemented by first AI system 104 can classify communication(s) into one of a predetermined number of categories based on the pattern(s) of the communication(s). For example, first AI system 104 can take as input a senior manager's memorandum to a junior manager of an enterprise or a voice recording of a conversation during a team meeting and can classify the input to indicate a system-determined context of a decision (e.g., hiring personnel, choosing a vendor, selecting a consultancy).

Given the system-determined context, first AI system 104 generates contextual insight data structure 118. Contextual insight data structure 118 embodies an object (e.g., vector) that quantifies critical contextual parameters for assessing decision making. In some embodiments, first AI system 104 can implement one or more machine learning models to determine among a predetermined set of successful decisions given the context the parameters that were critical to the decision making. For example, the set can comprise successful selections of one or more consulting firms in the past. Information engine 102 can retrieve electronic records from historical data compiled by the enterprise and/or search external data sources for relevant data. The machine learning implemented by first AI system 104, in some embodiments, is a random forest, which can determine which parameters were most influential on the outcomes of the past decisions. The random forest comprises multiple decision trees (corresponding to a sequence of decisions). As the random forest is adapted to the data (past decisions), errors in prediction (out-of-bag) are recorded and averaged. The importance of the i-th parameter after training is measured by permuting its values among the training data and the error is recomputed. An importance score of the parameter is computed before and after permutation of all the decision trees of the random forest and normalized by the standard deviation of the differences. Parameters that generate high scores are deemed more important than those that generate low scores.

First AI system 104 selects parameters for generating the contextual insight data structure 118, for example, based on the relative scores of various potential parameters. In one arrangement, contextual insight data structure 118 comprises a vector, the elements of the vector corresponding to the parameters selected. For example, with respect to the context of choosing a consultancy, the vector can correspond to the 5-tuple <expertise, experience, quality, cost, coverage>, where the first element is a measure of expertise, the second a time-measured experience, the third a quality measure, the fourth a monetary cost, and the fifth the extent of the consultancy's geographic reach (e.g., the countries in which the firm operates). Having determined the parameters, first AI system 104 directs information engine 102 to gather relevant data pertaining to each parameter from data sources 112a-112n. First AI system 104 can determine based on the data retrieved by information engine 102 thresholds or benchmarks for each of the parameters of contextual insight data structure 118. For example, with respect to choosing a consultancy, the contextual insight data structure generated by first AI system 104 can comprise the vector <9, 50, 8, 5, 10>. The first element can represent an average value on a predefine expertise scale (e.g., 1-10). The second element can represent an average number of years of operation. The third element can represent an average value on a predefined quality-of-work scale. The fourth element can represent a monetary value (millions of dollars). The fifth element can represent a number of countries. In other arrangements, the object represented by contextual insight data structure 118 can comprise a matrix or higher dimension tensor. Contextual insight data structure 118 additionally can include qualitative data. For example, a binary element that takes on a value a zero or one can indicate whether a consultancy operates in a specific country. In other arrangements, contextual insight data structure 118 can correspond to other attributes of the historical data represented by the object.

At block 204, system 100 is capable of generating perception data structure 120 using second AI system 106. Second AI system 106, in certain embodiments, performs natural language processing (NLP) of one or more communications (e.g., memorandum, email, text message, voice conversation) relating to the pending decision so as to identify the parameters a decision maker is considering in reaching a decision. NLP performed by second AI system 106 can be applied to conversations identified by parsing text and/or voice communications pertaining to the pending decision. Second AI system 106 can capture communications (text and/or voice) from one or more sources 122. Sources 112 can include for example, without limitation, enterprise communication platforms (e.g., messaging services), email, smart devices (e.g., smartphone, smartwatch), and IoT devices. The data can include memoranda and/or voice communications among decision making participants (e.g., members of an enterprise team) among themselves and/or between one or more participants and one or more external participants (e.g., prospective vendor, prospective hiring candidate). Using NLP, second AI system 106 can determine aspects of the decision that the decision maker is considering, based on which AI system 106 generates perception data structure 120. Perception data structure 120 can represent an object such as a tensor (e.g., vector), the elements of which are numerical values corresponding to key terms identified through NLP performed by second AI system 106.

As described below, system 100 is capable of enhancing data-driven decision making by providing a metric that quantifies the divergence between the decision maker's perception, represented by perception data structure 120, and data-driven insights, represented by contextual insight data structure 118. Determining a metric measuring the divergence necessitates comparing contextual insight data structure 118 and perception data structure 120. Thus, to facilitate comparison, comparing contextual insight data structure 118 and perception data structure 120 are generated as comparable data structures. For example, if contextual insight data structure 118 corresponds to the n-element vector $\bar{x}=(x_1, x_2, \ldots, x_n)$, where the i-th element is a value of the i-th critical parameter earlier identified, then perception data structure 120 is comparably structured as the n-element vector, $\bar{y}=(y_1, y_2, \ldots, y_n)$, in which the i-th element corresponds to the i-th element of $\bar{x}$ but whose value reflects the decision maker's perception. For example, in the context of hiring personnel or selecting someone for a team, the critical parameters may be education and experience (represented as a 2-element vector), contextual insight data structure 118 corresponds to $\bar{x}=(x_1, x_2)$, where the first element is years of experience, for example, and the second element is level of education. Comparably structured, perception data structure 120 corresponds $\bar{y}=(y_1, y_2)$, where the first and second elements are, respectively, the experience and education of a specific candidate currently perceived by the decision maker as the best candidate.

Perception data structure 120 is generated from communications captured from data source(s) 122. Data source(s) 122 include electronic communications between multiple users, including a primary user with responsibility for a decision, and can include real-time data streams involving the multiple users. The electronic communications of data source(s) 122 can include voice communications electronically recorded during a meeting or telephonic conference. Data source(s) 122 can include written communications conveyed over an intra-enterprise system, in emails, or via text messaging. In certain situations, second AI system 106 is unable to acquire from data source(s) 122 data pertaining to all critical parameters identified by first AI system 104, indicating that data captured (e.g., from an interoffice email, correspondence, and/or team conference) and processed through NLP does not include communications pertaining to one or more of the critical parameters. The AI implication is that one or more of the critical parameter(s) have not been considered, and thus, are not part of the decision maker's current perception. If NLP reveals that there is not a one-to-one correspondence between the critical parameters incorporated in contextual insight data structure 118 and those of perception data structure 120, there is a structural variance between the two data structures.

At block 206, in response to detecting a structural variance between perception data structure 120 and contextual insight data structure 118, second AI system 106 can perform a gap filing operation to supply missing elements needed to eliminate the variance and generate a comparable data structure. Second AI system 106 can instruct information engine 102 to search, identify, and retrieve data needed to generate the comparable data structure. For example, in the context of a decision to hire personnel or select a team member, if education or experience data are critical but not currently encapsulated in perception data structure 120 corresponding to a candidate currently considered, information engine 102 can search various structured and/or unstructured data sources, such as social networking sites, professional web sites, enterprise data sources, and the like to fetch, parse, and extract the needed data. If the data is available, second AI system 106 reconfigures perception data structure 120, generating a data structure comparable to contextual insight data structure 118.

For example, if contextual insight data structure 118 and perception data structure 120 are structured as vectors whose elements are values of parameters determined to be critical and one or more elements is missing from perception data structure 120, then second AI system 106 generates a comparable structure by restructuring the vector representation so as to include the missing elements. With the missing elements added, second AI system 106 inserts the extracted data in the newly added elements. If data is not available for one or more elements, second AI system 106 can mark each element for which no data is available as null or supply a zero.

Missing parameters can be populated by second AI system 106 in perception data structure 120 in response to comparing perception data structure 120 with contextual insight data structure 118 and identifying one or more parameters of contextual insight data structure 118 that are missing from perception data structure 120. AI system 106 can query one or more data sources in response to the identifying one or more missing parameters. The one or more data sources can include, for example, organization web sites, professional web sites, social networking sites, information and news sources, and the like. AI system 106 parses data retrieved from the one or more data sources to identify values for the one or more parameters identified and extracts values for the one or more parameters from the retrieved data. AI system 106 inserts the values in perception data structure 120, thereby making it comparable with contextual insight data structure 118.

At block 208, system 100 is capable of determining a delta between contextual insight data structure 118 and perception data structure 120 using delta generator 108. Delta generator 108, in certain embodiments, normalizes the critical parameters and maps the parameter values to $\mathbb{R}^n$, n corresponding to the number of critical parameters of critical insight data structure 118 and perception data structure 120. Delta generator 108 determines the delta, a predetermined metric, to quantitatively measure the deviation of perception data structure 120 from contextual insight data structure 118. In some embodiments in which perception data structure 120 and contextual insight data structure 118 both correspond to vectors, the delta, $\Delta$, is computed by subtracting the perception vector from the contextual insight vector and taking the 2-norm (L2) of the result:

$$\Delta = \sqrt{\sum_{i=1}^{n}(x_i - y_i)^2},$$

where $x_i$ is the value of the i-th element of the contextual insight vector, and $y_i$ is the i-th element of the perception vector. The delta quantifies a divergence between a data-driven decision, quantified by contextual insight data structure 118, and the perception of the decision maker, quantified by perception data structure 120. The greater the delta, the greater the divergence of the decision maker's perception relative to the system-determined contextual insight.

The normalized critical parameters that determine the delta can be weighted based a predetermined relative importance of each. Accordingly, in certain embodiments, the value of delta is:

$$\Delta = \sqrt{\sum_{i=1}^{n} c_i (x_i - y_i)^2},$$

where $x_i$ is the value of the i-th element of the contextual insight vector, $y_i$ is the i-th element of the perception vector, and $y_i$ is a predetermined weight based on the relative importance of the i-th critical parameter.

Delta also can reveal qualitative divergences between the decision maker's perception and a data-driven decision. The divergence is captured, in accordance with certain embodiments, by using a binary variable to represent qualitative parameters. A qualitative parameter can take on a value of one if a certain condition is satisfied, and if not, the qualitative parameter is given a value of zero. For example, in the context of a hiring decision, a critical parameter may be whether a candidate holds a particular certification. A vector representation of critical insight data structure has a value of one at the element corresponding to the critical parameter. The same element of a vector representation of perception data structure 120 has a value of one if a candidate currently considered by the decision maker holds the certification, but otherwise is zero. Similarly, the element may correspond to whether a consulting firm is licensed to work in country A. Regardless of how many other countries a consultancy currently considered by the decision maker may be able to work in, if country A is not among them, then the binary-valued element of perception data structure 120 is zero.

A binary variable can also be used to detect potential relationship biases. For example, perception data structure 120 may include a binary-valued element that is one if there is a predefined relationship between the decision maker and a currently considered candidate. The relationship can be a familial relationship (e.g., the candidate is related to someone presently employed by an organization), a business relationship (e.g., a candidate to join the board of directors of a business may presently be engaged in an outside venture with the CEO of the business), or other relationship that might potentially cloud—or at least be perceived as clouding—the judgment of the decision maker. If so, an element of perception data structure 120 corresponding to the pre-existing relationship parameter is given a value of one. The corresponding element of the contextual insight data structure 118 is given a value of zero. If the 2 L metric is used to measure delta, the presence of a pre-existing relationship increases the value of delta accordingly.

System 100 is capable of generating a recommendation based on the delta. The recommendation can be conveyed by system 100 to one or more users (e.g., decision maker) via a user device. The recommendation can be generated in response to delta generator 108 determining that the delta exceeds a predetermined threshold. The recommendation can be conveyed to the user by system 100 in a text message and/or voice-based notification conveyed via a wired or wireless connection to a user's computing device (e.g., desk computer, laptop), communication device (e.g., phone), and/or smart device (e.g., smartphone, smartwatch, smart glasses). The recommendation can indicate how much a current perception (represented by perception data structure 120) diverges from objective, data-driven insight (represented by contextual insight data structure 118). Delta, which can be conveyed in the recommendation, provides a quantitative measure of the deviation between current perception and data-driven insight.

System 100 also is capable of highlighting specific parameters where the respective parameters deviate one from another. The parameters can be identified in the recommendation to the user. The system-generated recommendation can, for example, individually compare critical parameters of contextual insight data structure 118 and perception data structure 120. Quantitatively and/or qualitatively (based on a binary value), values of individual parameters of contextual insight data structure 118 and perception data structure 120, to give a measurement the degree to which one or more of the parameters of contextual insight data structure 118 and perception data structure 120 diverge.

Figure 3:
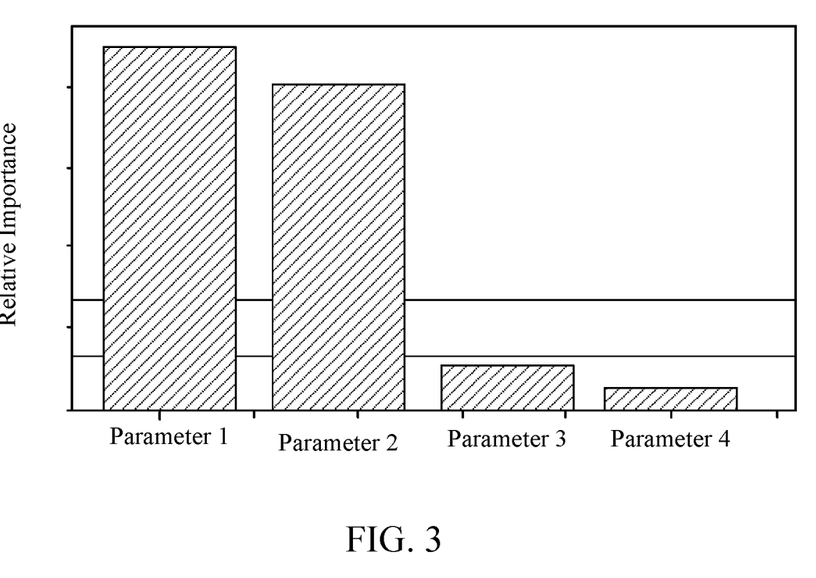
FIG. 3 illustrates an example screen display generated by the system of FIG. 1.

Optionally, system 100 also includes visualizer 110. Visualizer 110 generates one or more visual images that provide a graphical depiction, for example, of the delta and the corresponding divergence between critical insight data structure 118 and perception data structure 120. For example, visualizer 110 can generate images on the display of a device in which critical insight data structure 118 and perception data structure 120 are shown as vectors and the delta as a vector difference. Using 3D imaging, for example, vector representations of critical insight data structure 118 and perception data structure 120 comprising different combinations of critical parameters in $\mathbb{R}^3$ space can be shown. In other arrangements, the respective values of the critical parameters of contextual insight data structure 118 and perception data structure 120 can be shown in a side-by-side comparison. FIG. 3, for example, depicts an example visual display generated by visualizer 110 in which the relative importance determined for each of four parameters identified as critical to a specific decision are shown.

Decision making is often an iterative process involving multiple communications through in-person conversations, memoranda, emails, text message, and the like. For an enterprise, these can be captured (e.g., via voluntary submission of text and/or voice recordings by members of an enterprise to an enterprise-wide communication system). As facts come to light and new or modified assumptions emerge, perceptions can change. The changes are reflected in changes to perception data structure 120, which likewise gives rise to changes in the delta, as well. Accordingly, in certain embodiments, system 100 implements a blockchain to document and validate the change in perceptions by providing a record of communications ("transactions") pertaining to a decision. The blockchain is an expandable list of cryptographically linked blocks (data), each block containing a cryptographic hash of the previous block, a timestamp, and transaction data. System 100 uses the blockchain to validate each transaction and decision, recording each in the blockchain ledger.

In providing tamper-proof, auditable information, the blockchain can serve as a trusted ledger. Various entities—individual users, IoT devices, integrated systems and platforms, and the like—that interact through system 100 using the blockchain operate as network agents whose transactions are recorded in the trusted ledger. System 100, implementing a smart contract within the blockchain, can ensure that only necessary and reliable data is accepted as valid, and that other information is invalidated and discarded. The smart contract comprises processor-executable code that runs on the blockchain. Operatively, the smart contract is a self-executing structure that can verify whether one or more pre-defined conditions are satisfied. Only if the condition(s) are satisfied is a data structure recorded in the blockchain. For example, the blockchain upon receiving multiple feeds from various sources (e.g., IoT devices, portable devices, wearables, collaboration platforms, and the like) performs self-executing verifications of each feed to determine whether the one or more pre-defined conditions are satisfied. Data structures (e.g., representations of sentences, phrases, keywords, data points, and the like) that are received via the feeds are recorded only if validated, unverified and unrelated data structures are discarded. Moreover, a smart contract key can protect personally identifiable and sensitive personal information (PI/SPI), responding to data requests by only delivering requested information upon proper validation with the smart contract key.

The blockchain, as a trusted ledger, can be used by system 100 to provide a focused, trusted source for building other reliable data structures such as informational data marts, for example. The blockchain can be used to validate information used in deriving the delta or other such metrics, and the information made available for auditing and other analytical uses.

Decision making typically involves underlying facts and assumptions. To simulate outcomes from different decisions, system 100 in certain embodiments additionally implements a digital twin to simulate various scenarios pertaining to a decision given a specific context. The digital twin provides a virtual representation of the underlying facts and assumptions of a pending decision. By simulating with the digital twin changes in key assumptions (reflected by changes in reflected in perception data structure 120), the effect of the changes on delta can be determined. The changes may bring the current perception (reflected in contextual insight data structure 118) closer to or move perception farther away from the current contextual insight (reflected in contextual insight data structure 118). Similarly, by simulating with the digital twin changes in underlying facts (reflected by changes in contextual insight data structure 118), the effect of the changes on delta can again be determined but in the context of whether the changes bring the contextual insight closer to or move the insight farther away from the current perception of the decision maker (reflected in perception data structure 120). System 100 can generate a contextual insight data mart and/or perception data mart and populate each with outcomes of various simulations generated using the digital twin.

For example, in the context of candidate selections, an enterprise confronts very different scenarios in selecting a new hire from a pool of recent graduates versus selecting an experienced candidate to fill a senior position. The selection parameters can differ significantly in the different contexts. A digital twin can simulate various scenarios in such varied contexts. Through crowd sourcing, accessing network sites, and collecting enterprise information, the digital twin can derive different parameters, which correspond to facts and assumptions, and can provide historical context to different situations. The digital twin can derive multi-domain data marts for various domains corresponding to the different situations.

FIG. 4 illustrates a schematic of an example of a computing node 400. In one or more embodiments, computing node 400 is an example of a server (e.g., enterprise or cloud-based server). Computing node 400 is not intended to suggest any limitation as to the scope of use or functionality of embodiments of the invention described herein. Computing node 400 is capable of performing any of the functionality described within this disclosure.

Computing node 400 includes a computer system 412, which is operational with numerous other general-purpose or special-purpose computing system environments or configurations. Examples of well-known computing systems, environments, and/or configurations that may be suitable for use with computer system 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 412 may be described in the general context of computer system-executable instructions, such as program modules, being executed by a computer system. Generally, program modules may include routines, programs, objects, components, logic, data structures, and so on that perform particular tasks or implement particular abstract data types. Computer system 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system 412 is shown in the form of a general-purpose computing device. The components of computer system 412 may include, but are not limited to, one or more processors 416, a memory 428, and a bus 418 that couples various system components including memory 428 to processor 416. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 418 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 412 typically includes a variety of computer system-readable media. Such media may be any available media that is accessible by computer system 412, and may include both volatile and non-volatile media, removable and non-removable media.

Memory 428 may include computer system readable media in the form of volatile memory, such as random-access memory (RAM) 430 and/or cache memory 432. Computer system 412 may further include other removable/non-removable, volatile/non-volatile computer system storage media. By way of example, storage system 434 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. For example, one or more of the program modules may include a data-driven decision enhancement system, such as system 100 or 696 (FIG. 6), or portions thereof.

Program/utility 440 is executable by processor 416. Program/utility 440 and any data items used, generated, and/or operated upon by computer system 412 are functional data structures that impart functionality when employed by computer system 412. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 412 may also communicate with one or more external devices 414 such as a keyboard, a pointing device, a display 424, etc.; one or more devices that enable a user to interact with computer system 412; and/or any devices (e.g., network card, modem, etc.) that enable computer system 412 to communicate with one or more other computing devices. Such communication can occur via input/output (I/O) interfaces 422. Still, computer system 412 can communicate with one or more networks such as a local area network (LAN), a general wide area network (WAN), and/or a public network (e.g., the Internet) via network adapter 420. As depicted, network adapter 420 communicates with the other components of computer system 412 via bus 418. It should be understood that although not shown, other hardware and/or software components could be used in conjunction with computer system 412. Examples, include, but are not limited to: microcode, device drivers, redundant processing units, external disk drive arrays, RAID systems, tape drives, and data archival storage systems, etc.

Computing node 400 is an example of computer hardware. Computing node 400 may include fewer components than shown or additional components not illustrated in FIG. 4 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 400 is also an example of a server, such as enterprise-wide server or a cloud-based server. As defined herein, "server" means a system configured to share services with one or more other systems and/or device. Examples of devices include, but are not limited to, a workstation, a desktop computer, a computer terminal, a mobile computer, a laptop computer, a netbook computer, a tablet computer, a smart phone, a personal digital assistant, a smart watch, smart glasses, a set-top box, a smart television and the like. In one or more embodiments, the various user devices described herein may be client devices. As defined herein, "client device" means a system that requests shared services from a server, and with which a user directly interacts. Network infrastructure, such as routers, firewalls, switches, access points and the like, are not client devices as the term is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
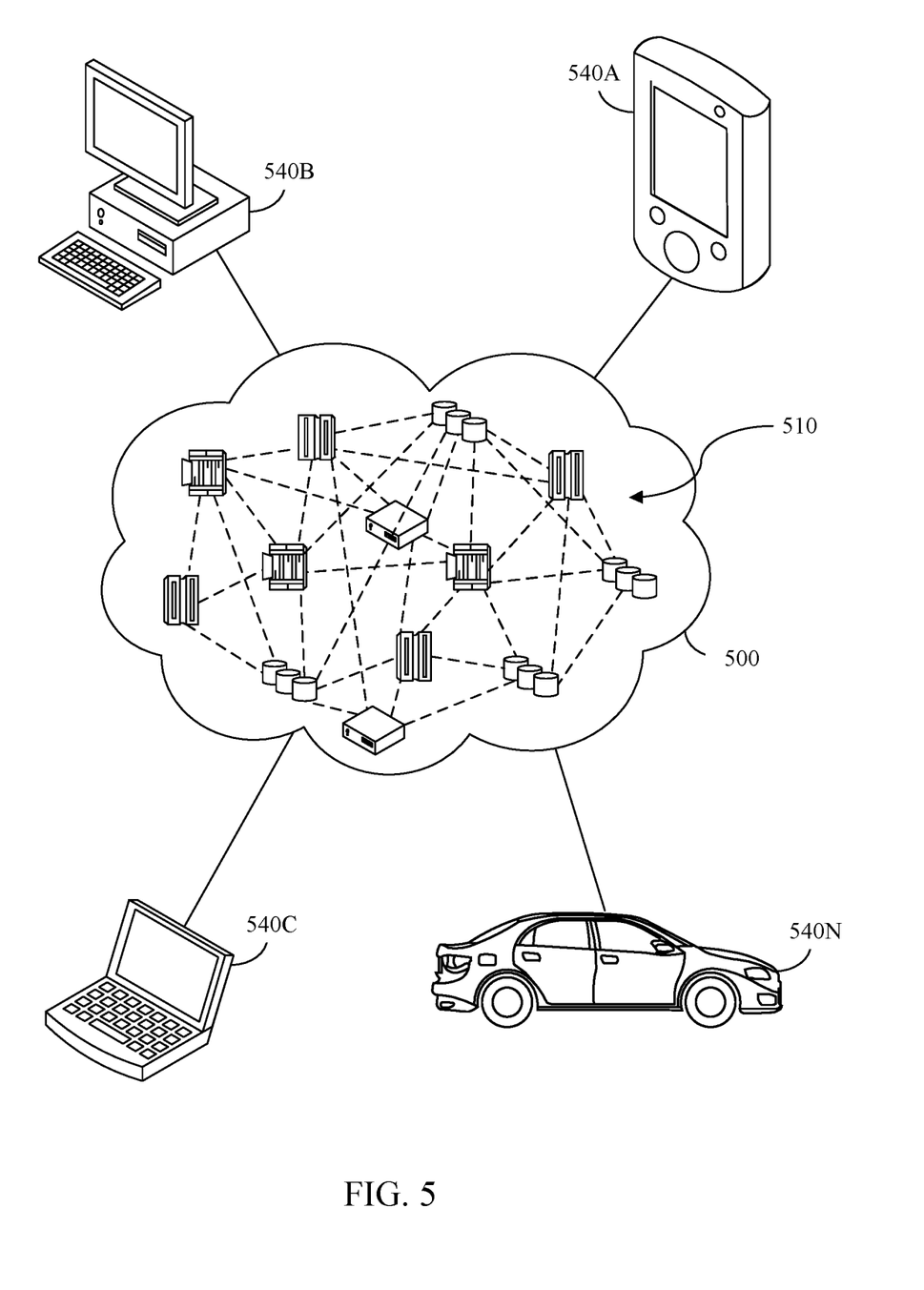
FIG. 5 illustrates an example cloud computing environment.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540a, desktop computer 540b, laptop computer 540c, and/or automobile computer system 540n may communicate. Computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540a-n shown in FIG. 5 are intended to be illustrative only and that computing nodes 510 and cloud computing environment 500 can communicate with any type of computerized device over any type of network and/or network addressable connection (e.g., using a web browser).

Figure 6:
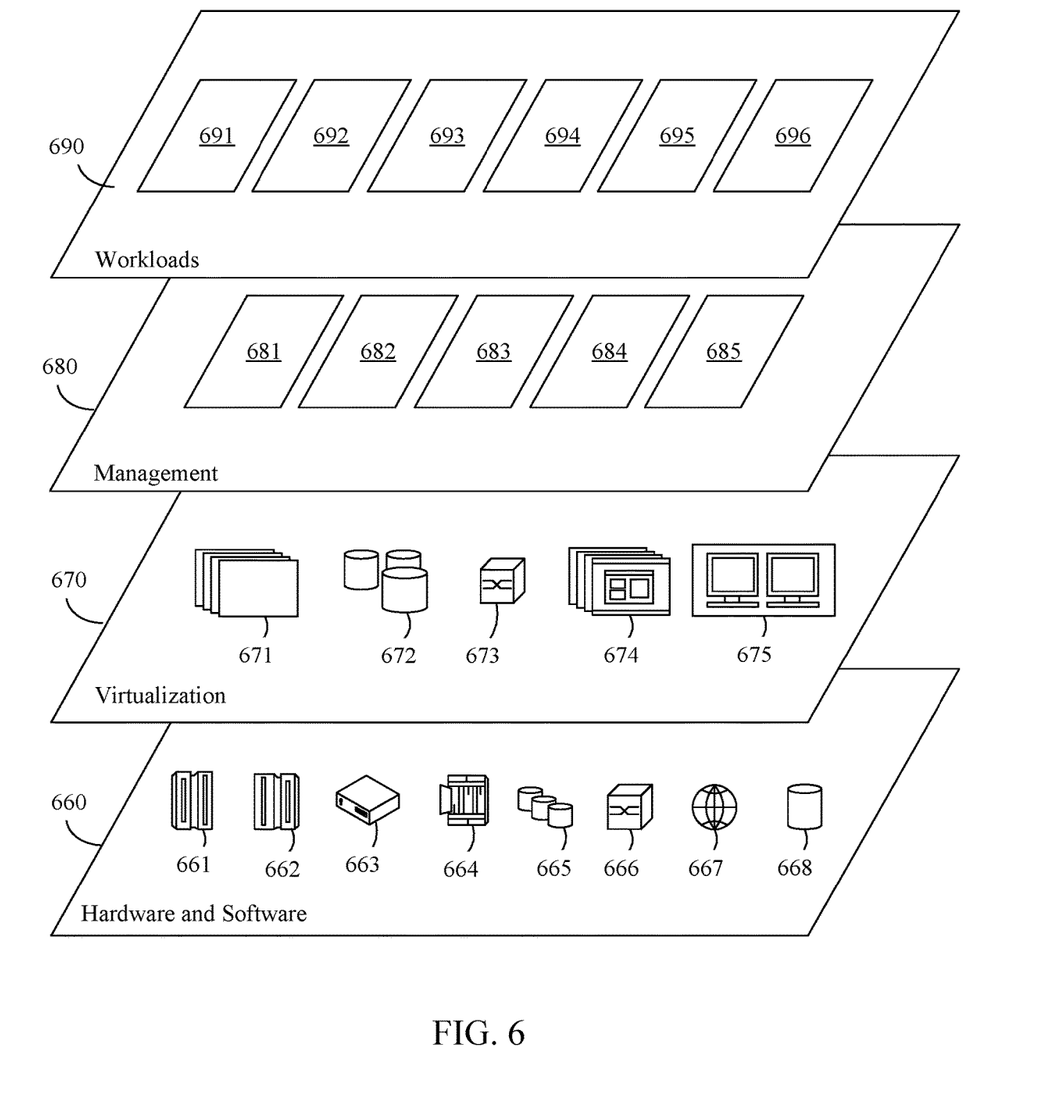
FIG. 6 depicts abstraction model layers.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes 661; RISC (Reduced Instruction Set Computer) architecture-based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and data-driven decision enhancement system 696.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real-time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user," "decision maker," "candidate," "individual," and "member" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating a contextual insight data structure using a first artificial intelligence system that operates on one or more information data structures selected based on a system-determined context of a programmatically defined action, wherein the contextual insight data structure quantifies critical contextual parameters for assessing decision making;
generating a perception data structure using a second artificial intelligence system that performs natural language processing of one or more electronic communications exchanged among a plurality of users relating to the programmatically defined action, wherein the perception data structure quantifies parameters that a decision maker is considering in reaching a pending decision;
comparing respective structures of the perception data structure and the contextual insight data structure, to detect a structural variance between the perception data structure and the contextual insight data structure;
in response to detecting the structural variance, populating the perception data structure with one or more data items selected from the information data structures, to cause a structure of the perception data structure to be comparable to a structure of the contextual insight data structure;
determining a delta between the contextual insight data structure and the perception data structure, wherein the delta is based on a predetermined metric that measures a quantitative divergence between the contextual insight data structure and the perception data structure; and
generating an electronic recommendation based on the delta and delivering the electronic recommendation to at least one of the plurality of users via a user device.

2. The computer-implemented method of claim 1, wherein the electronic recommendation includes an identification of one or more parameters of the programmatically defined action, one or more parameters included in the contextual insight data structure, and the perception data structure.

3. The computer-implemented method of claim 2, comprising:
based on the comparing, identifying quantitative differences between the one or more parameters included in the contextual insight data structure and corresponding one or more parameters included in the perception data structure.

4. The computer-implemented method of claim 1, comprising
generating a visualization of one or more aspects of the delta, wherein the one or more aspects include at least one of a vector distance between vector representations corresponding to the contextual insight data structure and perception data structure or graphical comparisons of values of elements of vector representations corresponding to the contextual insight data structure and perception data structure; and
presenting the visualization on a display of a user device.

5. The computer-implemented method of claim 1, wherein the populating includes:
based on the comparing, identifying one or more parameters of the contextual insight data structure that are missing from the perception data structure;
querying one or more data sources in response to the identifying;
parsing data retrieved from the one or more data sources to identify values for the one or more parameters;
extracting the values for the one or more parameters from the retrieved data; and
inserting the values into the perception data structure.

6. The computer-implemented method of claim 1, comprising:
validating a sequence of transactions using a blockchain, wherein the transactions correspond to the one or more electronic communications.

7. The computer-implemented method of claim 1, wherein
the one or more electronic communications includes at least one of a voice-based conversation over a smart device or a text message conveyed over the smart device.

8. The computer-implemented method of claim 1, comprising:
performing one or more simulations using a digital twin; and
determining, based on the one or more simulations, a change in the perception data structure.

9. The computer-implemented method of claim 1, comprising:
generating a contextual insight data mart and a perception data mart and populating each with outcomes generated using a digital twin.

10. A system, comprising:
a processor configured to initiate operations including:
generating a contextual insight data structure using a first artificial intelligence system that operates on one or more information data structures selected based on a system-determined context of a programmatically defined action, wherein the contextual insight data structure quantifies critical contextual parameters for assessing decision making;
generating a perception data structure using a second artificial intelligence system that performs natural language processing of one or more electronic communications exchanged among a plurality of users relating to the programmatically defined action, wherein the perception data structure quantifies parameters that a decision maker is considering in reaching a decision;

comparing respective structures of the perception data structure and the contextual insight data structure, to detect a structural variance between the perception data structure and the contextual insight data structure;

in response to detecting the structural variance, populating the perception data structure with one or more data items selected from the information data structures, to cause a structure of the perception data structure to be comparable to a structure of the contextual insight data structure;

determining a delta between the contextual insight data structure and the perception data structure, wherein the delta is based on a predetermined metric that measures a quantitative divergence between the contextual insight data structure and the perception data structure; and generating an electronic recommendation based on the delta and delivering the electronic recommendation to at least one of the plurality of users via a user device.

11. The system of claim 10, wherein the electronic recommendation includes an identification of one or more parameters of the programmatically defined action, the one or more parameters included in the contextual insight data structure and the perception data structure.

12. The system of claim 11, wherein the processor is configured to initiate further operations including:
based on the comparing, identifying quantitative differences between one or more critical parameters included in the contextual insight data structure and corresponding one or more critical parameters included in the perception data structure.

13. The system of claim 10, wherein the processor is configured to initiate further operations including:
generating a visualization of one or more aspects of the delta, wherein the one or more aspects include at least one of a vector distance between vector representations corresponding to the contextual insight data structure and perception data structure or graphical comparisons of values of elements of vector representations corresponding to the contextual insight data structure and perception data structure; and
presenting the visualization on a display of a user device.

14. The system of claim 10, wherein the populating includes:
based on the comparing, identifying one or more parameters of the contextual insight data structure that are missing from the perception data structure;
querying one or more data sources in response to the identifying;
parsing data retrieved from the one or more data sources to identify values for the one or more parameters;
extracting the values for the one or more parameters from the retrieved data; and
inserting the values into the perception data structure.

15. The system of claim 10, wherein the processor is configured to initiate further operations including:
validating a sequence of transactions using a blockchain, wherein the transactions correspond to the one or more electronic communications.

16. The system of claim 10, wherein
the one or more electronic communications includes at least one of a voice-based conversation over a smart device or a text message conveyed over the smart device.

17. The system of claim 10, wherein the processor is configured to initiate further operations including:
performing one or more simulations using a digital twin; and
determining, based on the one or more simulations, a change in the perception data structure.

18. The system of claim 10, wherein the processor is configured to initiate further operations including:
generating a contextual insight data mart and a perception data mart and populating the contextual insight data mart and the perception data mart with outcomes generated using a digital twin.

19. A computer program product, the computer program product comprising:
one or more computer-readable storage media and program instructions collectively stored on the one or more computer-readable storage media, the program instructions executable by a processor to cause the processor to initiate operations including:
generating a contextual insight data structure using a first artificial intelligence system that operates on one or more information data structures selected based on a system-determined context of a programmatically defined action, wherein the contextual insight data structure quantifies critical contextual parameters for assessing decision making;
generating a perception data structure using a second artificial intelligence system that performs natural language processing of one or more electronic communications exchanged among a plurality of users relating to the programmatically defined action, wherein the perception data structure quantifies parameters that a decision maker is considering in reaching a decision;
comparing respective structures of the perception data structure and the contextual insight data structure, to detect a structural variance between the perception data structure and the contextual insight data structure;
in response to detecting the structural variance, populating the perception data structure with one or more data items selected from the information data structures, to cause a structure of the perception data structure to be comparable to a structure of the contextual insight data structure;
determining a delta between the contextual insight data structure and the perception data structure, wherein the delta is based on a predetermined metric that measures a quantitative divergence between the contextual insight data structure and the perception data structure; and
generating an electronic recommendation based on the delta and delivering the electronic recommendation to at least one of the plurality of users via a user device.

20. The computer program product of claim 19, wherein the electronic recommendation includes an identification of one or more parameters of the programmatically defined action, the one or more parameters included in the contextual insight data structure and the perception data structure.

* * * * *